UNITED STATES PATENT OFFICE.

PAUL W. KEATING, OF NORWICH, CONNECTICUT.

IMPROVED COMPOSITION FOR BLACKING LEATHER.

Specification forming part of Letters Patent No. 47,957, dated May 30, 1865.

*To all whom it may concern:*

Be it known that I, PAUL W. KEATING, of the town of Norwich, county of New London, and State of Connecticut, have invented a new Composition of Matter for Blacking Leather and Harnesses; and I do hereby declare that the following is a full and exact statement of the ingredients used in the manufacture of the same, and of the proportions of each, and also a full description of the process of manufacture of the said composition of matter.

The proportions to a pint of the blacking are: one pint neat's-foot oil; one scruple lamp-black; two drams white wax. Take one-quarter of the oil, and put in the wax broken fine. Heat and thoroughly dissolve. Then put in the black and thoroughly mix the whole. Pour the remainder of the oil cold into the mixture.

I claim for the above composition, and as its peculiar property, that it will make the leather to which it is applied soft and pliable, will thoroughly black the same, and that the blacking, when applied, will be so absorbed that no dirt or black will be rubbed off at the touch. I claim any mixture of the above ingredients substantially the same and producing substantially the same results. I propose to call the above mixture "Keating's Harness Blacking."

What I claim, and desire to secure by Letters Patent, is—

The composition of matter, of the ingredients, in the proportions, and mixed in the mode above described.

PAUL W. KEATING.

In presence of—
   H. A. STEVENS,
   CALVIN L. RAWSON.